(12) United States Patent
Bueker et al.

(10) Patent No.: US 12,525,822 B2
(45) Date of Patent: Jan. 13, 2026

(54) TRANSMITTING DEVICE AND ENERGY TRANSFER SYSTEM FOR CONTACTLESS TRANSFER OF ELECTRIC ENERGY BY MEANS OF INDUCTIVE COUPLING OR BY MEANS OF CAPACITIVE COUPLING

(71) Applicant: Fraunhofer-Gesellschaft zur Foerderung der angewandten Forschung e.V., Munich (DE)

(72) Inventors: Maik-Julian Bueker, Chemnitz (DE); Steffen Wittemeier, Bielefeld (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 54 days.

(21) Appl. No.: 18/175,370

(22) Filed: Feb. 27, 2023

(65) Prior Publication Data
US 2023/0208195 A1  Jun. 29, 2023

Related U.S. Application Data
(63) Continuation of application No. PCT/EP2021/073568, filed on Aug. 26, 2021.

(30) Foreign Application Priority Data

Aug. 28, 2020 (DE) .......................... 102020210894.3

(51) Int. Cl.
*H02J 50/10* (2016.01)
*H02J 50/05* (2016.01)
*H02J 50/40* (2016.01)

(52) U.S. Cl.
CPC .............. *H02J 50/10* (2016.02); *H02J 50/05* (2016.02); *H02J 50/402* (2020.01)

(58) Field of Classification Search
CPC .................................................... H02J 50/402
See application file for complete search history.

(56) References Cited

U.S. PATENT DOCUMENTS 9,013,068 B2  4/2015 Ryu et al.
10,230,271 B2  3/2019 Joyce et al.
(Continued)

FOREIGN PATENT DOCUMENTS

CN 104485507 A 4/2015
CN 110620446 A 12/2019
(Continued)

OTHER PUBLICATIONS

Adve, Raviraj, "Optimal Beamforming", University of Toronto—Department of Electrical and Computer Engineering URL: https://www.comm.utoronto.ca/~rsadve/Notes/BeamForming.pdf, pp. 1-21.
(Continued)

*Primary Examiner* — Daniel Kessie
(74) *Attorney, Agent, or Firm* — Perkins Coie LLP; Michael A. Glenn (57) ABSTRACT

Disclosed is a transmitting device for contactless transfer of electric energy by means of inductive coupling or by means of capacitive coupling to one or several receiving modules, each comprising a field receiving element for receiving electric energy, the transmitting device including: a plurality of transmitting modules, each including a field generating element for generating an alternating energy field and an electric energy source for providing an electric alternating quantity to the respective field generating element in a wired manner; and controller configured, in an energy transfer mode, to control the electric energy sources such that a plurality of the transmitting modules simultaneously generate one of the electric alternating fields each, wherein, in the energy transfer mode, the electric alternating fields are controlled in dependence on a singular value decomposition
(Continued)

of a matrix depending on a coupling matrix, wherein the coupling matrix comprises coupling factors to several or to all of the field receiving elements for several or for all of the field generating elements.

10 Claims, 6 Drawing Sheets

(56) References Cited

U.S. PATENT DOCUMENTS

| | | | |
|---|---|---|---|
| 10,396,859 B1 | 8/2019 | Hong et al. | |
| 10,425,837 B2 | 9/2019 | Urzhumov et al. | |
| 10,797,532 B2 | 10/2020 | Cha | |
| 2014/0184150 A1 | 7/2014 | Walley | |
| 2015/0008753 A1 | 1/2015 | Park et al. | |
| 2015/0236526 A1 | 8/2015 | Jadidian et al. | |
| 2015/0280444 A1* | 10/2015 | Smith | H02J 50/20 307/104 |
| 2018/0323637 A1* | 11/2018 | Katabi | H02J 50/12 |
| 2019/0319486 A1 | 10/2019 | Schumann et al. | |
| 2019/0348865 A1 | 11/2019 | Kurs et al. | |
| 2020/0200937 A1 | 6/2020 | Widmer et al. | |
| 2023/0231420 A1* | 7/2023 | Bhandarkar | H02J 50/402 307/104 |

FOREIGN PATENT DOCUMENTS

| | | |
|---|---|---|
| DE | 102016221225 A1 | 5/2018 |
| DE | 102018219460 A1 | 5/2020 |
| EP | 2346136 A1 | 7/2011 |
| EP | 3054559 A1 | 8/2016 |
| EP | 3358710 A1 | 8/2018 |
| JP | 2011199975 A | 10/2011 |
| KR | 101916636 B1 | 11/2018 |
| KR | 101932383 B1 | 12/2018 |
| KR | 102029919 B1 | 10/2019 |
| WO | 2017171435 A1 | 10/2017 |

OTHER PUBLICATIONS

Fu, Minfan, et al., "Compensation of Cross Coupling in Multiple-Receiver Wireless Power Transfer Systems", (Apr. 2016) 15887421, IEEE Transactions on Industrial Informatics, DOI: 10.1109/TII.2016.2516906, 9 pp.

Fu, Minfan, et al., "Efficiency and optimal loads analysis for multiple-receiver wireless power Transfer systems", In: IEEE Transactions on Microwave Theory and Techniques, vol. 63 (Mar. 2015) pp. 801-812.—ISSN 0018-9480 (p); 0018-9480 (e). DOI: 10.1109/TMTT.2015.2398422 URL: https://ieeexplore.ieee.org/stamp/stamp.jsp?tp=&arnumber=7039263, pp. 801-812.

Li, Siqi, et al., "Wireless Power Transfer for Electric Vehicle Applications", IEEE Journal of Emerging and Selected Topics in Power Electronics, Piscataway, NJ, USA, vol. 3, No. 1, doi:10.1109/JESTPE.2014.2319453, ISSN 2168-6777 (Jan. 29, 2015), XP011571726 [A] 1-13 *V. Power Electronics converted and power control; p. 11; fig 7a,8 *, pp. 4-17.

Yang, Gang, et al., "Magnetic beamforming for wireless power transfer", In: IEEE International Conference on Acoustics, Speech and Signal Processing Mar. 20-25, 2016 Shanghai, China, S. ISBN 978-1-4799-9988-0. DOI:10.1109/ICASSP.2016. 7 4 72415. URL https://ieeexplore.ieee.org/stamp/stamp.jsp?tp=&arnumber=7472415, pp. 3936-3940.

Zhang, Tong, et al., "Optimal load analysis for a two-receiver wireless power transfer system", In: IEEE Wireless Power Transfer Conference—May 8-9, 2014—Jeju, South Korea, S. 84-87. ISBN 978-1-4799-2923-8. DOI: 10.1109/WPT.2014.6839600 https://ieeexplore.ieee.org/stamp/stamp.jsp?tp=&arnumber=6839600, pp. 84-87.

Zhuo, Kang, et al., "A coaxial dual-receiver wireless power transfer system with bipolar coils to eliminate cross-coupling and achieve a controllable power distribution", In: IEICE Electronics Express (ELEX), Bd. 17, 2020, H. 1, S. 1-6.—ISSN 1349-2543 (e). DOI: 10.1109/TI1.2016.2516906 URL: https://www.jstage.jst.go.jp/article/elex/17/1/17_16.20190693/_pdf/-char/en, pp. 1-6.

* cited by examiner

Fig. 4 state

|   | real | imaginary | complex |
|---|---|---|---|
| P | 10 | 0 | 10.00000 ∠ 0° |
| U | 0 | 10 | 10.00000 ∠ 90° |
| I | 0 | -1 | 1.00000 ∠ -90° |

M_{RX, TX}

| TX | omegaM | U_{RX}/{I_TX} |
|---|---|---|
| coil 1 | -0.4369 | -0.0000 - 0.4040i |
| coil 2 | -0.7787 | -0.0000 - 0.7202i |
| coil 3 | -0.4371 | -0.0000 - 0.4042i |
| coil 4 | -1.6771 | -0.0000 - 1.5511i |
| coil 5 | -1.6774 | -0.0000 - 1.5514i |
| coil 6 | -1.6338 | -0.0000 - 1.5110i |
| coil 7 | 11.1538 | 0.0000 + 10.3158i |
| coil 8 | -1.6327 | -0.0000 - 1.5100i |
| coil 9 | 8.2284 | 0.0000 + 7.6101i |
| coil 10 | 8.2235 | 0.0000 + 7.6056i |
| coil 11 | -1.4846 | -0.0000 - 1.3731i |
| coil 12 | 5.9640 | 0.0000 + 5.5159i |
| coil 13 | -1.4853 | -0.0000 - 1.3737i |
| coil 14 | 0 |  |

Fig. 5

| | name | function | X/mm | Y/mm | Z/mm | R/Ω | Rl/Ω | Rl_opt/Ω | Psoll/W | P/W | U/V | I/A |
|---|---|---|---|---|---|---|---|---|---|---|---|---|
| 1 | coil 1 | TX | -67 | -67 | 0 | 0.8124 | | | | 0.0068 + 0.0047i | 0.546 ∠ -145° | -0.0152 |
| 2 | coil 2 | TX | 0 | -67 | 0 | 0.8124 | | | | 0.0216 + 0.0467i | 1.905 ∠ -115° | -0.0270 |
| 3 | coil 3 | TX | 67 | -67 | 0 | 0.8124 | | | | 0.0068 + 0.0047i | 0.548 ∠ -145° | -0.0152 |
| 4 | coil 4 | TX | -33.5000 | -33.5000 | 0 | 0.8124 | | | | 0.1003 + 0.0762i | 2.165 ∠ -143° | -0.0582 |
| 5 | coil 5 | TX | 33.5000 | -33.5000 | 0 | 0.8124 | | | | 0.1004 + 0.0753i | 2.156 ∠ -143° | -0.0582 |
| 6 | coil 6 | TX | -67 | 0 | 0 | 0.8124 | | | | 0.0952 + 0.0912i | 2.327 ∠ -136° | -0.0567 |
| 7 | coil 7 | TX | 0 | 0 | 0 | 0.8124 | | | | 4.4376 - 0.0766i | 11.470 ∠ -0.989° | 0.3869 |
| 8 | coil 8 | TX | 67 | 0 | 0 | 0.8124 | | | | 0.0951 + 0.0906i | 2.319 ∠ -136° | -0.0586 |
| 9 | coil 9 | TX | -33.5000 | 33.5000 | 0 | 0.8124 | | | | 2.4150 - 0.2247i | 8.497 ∠ -5.32° | 0.2855 |
| 10 | coil 10 | TX | 33.5000 | 33.5000 | 0 | 0.8124 | | | | 2.4122 + 0.2264i | 8.492 ∠ -5.36° | 0.2853 |
| 11 | coil 11 | TX | -67 | 67 | 0 | 0.8124 | | | | 0.0786 + 0.0586i | 1.904 ∠ -143° | -0.0515 |
| 12 | coil 12 | TX | 0 | 67 | 0 | 0.8124 | | | | 1.2688 - 0.2084i | 6.214 ∠ -9.33° | 0.2069 |
| 13 | coil 13 | TX | 67 | 67 | 0 | 0.8124 | | | | 0.0787 + 0.0591i | 1.909 ∠ -143° | -0.0515 |
| 14 | coil 14 | RX | 0 | 30 | 16 | 0.8124 | 10 | 17.6728 | 10 | 10 | 10.000 ∠ 90° | 1.000 ∠ -90° |

Fig. 6

TRANSMITTING DEVICE AND ENERGY TRANSFER SYSTEM FOR CONTACTLESS TRANSFER OF ELECTRIC ENERGY BY MEANS OF INDUCTIVE COUPLING OR BY MEANS OF CAPACITIVE COUPLING

CROSS-REFERENCE TO RELATED APPLICATIONS

This application is a continuation of copending International Application No. PCT/EP2021/073568, filed Aug. 26, 2021, which is incorporated herein by reference in its entirety, and additionally claims priority from German Application No. 102020210894.3, filed Aug. 28, 2020, which is also incorporated herein by reference in its entirety.

The invention relates to energy transfer systems for contactless transfer of electric energy by means of inductive coupling or by means of capacitive coupling and, in particular, to a transmitting device for such an energy transfer system.

BACKGROUND OF THE INVENTION

Contactless electric energy transfer systems are known from references [1] to [17].

SUMMARY

An embodiment may have an energy transfer system for contactless transfer of electric energy by means of inductive coupling or by means of capacitive coupling from a transmitting device of the energy transfer system to several receiving modules of the energy transfer system; wherein the receiving modules each include a field receiving element for receiving electric energy; wherein the transmitting device includes a plurality of transmitting modules and control means; wherein the transmitting modules each include a field generating element for generating an alternating energy field and an electric energy source for providing an electric alternating quantity to the respective field generating element in a wired manner; wherein, in an energy transfer mode, the control means is configured to control the electric energy sources such that several of the transmitting modules simultaneously generate one of the alternating energy fields each, wherein, in the energy transfer mode, the electric alternating quantities are controlled in dependence on a coupling matrix, wherein the coupling matrix includes coupling factors to several or to all of the field receiving elements for several or for all of the field generating elements, wherein at least one of the receiving modules includes an adjustable compensation element connected in parallel or in series to the field receiving element, wherein the respective receiving module is configured to adjust the respective compensation element in dependence on a cross coupling matrix, wherein the cross coupling matrix includes cross coupling factors to several or to all of the other field receiving elements for several or all of the field receiving elements.

An embodiment may have a transmitting device for contactless transfer of electric energy to one or several receiving modules, each comprising a field receiving element for receiving electric energy, the transmitting device comprising:

a plurality of transmitting modules, each comprising a field generating element for generating an alternating energy field and an electric energy source for providing an electric alternating quantity to the respective field generating element in a wired manner; and control means configured to control the electric energy sources in an energy transfer mode such that several of the transmitting modules each simultaneously generate one of the alternating energy fields, wherein, in the energy transfer mode, the electric alternating quantities are controlled in dependence on a coupling matrix, wherein the coupling matrix includes coupling factors to several or to all of the field receiving elements for several or for all of the field generating elements.

By using inductive coupling, where energy is essentially transferred via an electric (near) field, or by using capacitive coupling, where energy is essentially transferred via a magnetic (near) field, a higher efficiency can be achieved than by using radiation coupling, where energy is essentially transferred via an electromagnetic (far) field.

The electric alternating quantity can be an alternating current or an alternating voltage. Accordingly, the energy source can be an alternating current source or an alternating voltage source. The electric alternating quantities of the different transmitting modules have the same angular frequency.

The control means can be an electronic control means in particular. The same can be implemented in hardware or in a combination of hardware and software.

A coupling factor corresponds to the imaginary part of the stray impedance between one of the field receiving elements and one of the field generating elements divided by the angular velocity. In the case of inductive coupling, the stray impedance is the stray inductance, and in the case of capacitive coupling, the stray capacitance between one of the field receiving elements and one of the field generating elements. If the coupling factors are arranged matrix-like, this results in the coupling matrix.

If only one receiving module is provided, the coupling matrix becomes one-dimensional. Assuming that the transmitting modules are identical in construction or have the same electric properties, the optimum distribution of the currents in the transmitting modules is then proportional to the values of the one-dimensional coupling matrix. The values of the currents then result from the needed energy.

In this way, a higher electric efficiency can be achieved than is the case with transmitting devices where, as described in [1], only one of several transmitting modules is used during the transfer of electric energy. In addition, a higher electric efficiency can be achieved than is the case with transmitting devices where metamaterials are used, as described in [3]. Above that, a higher electric efficiency can be achieved in this way than is the case with transmitting devices where, as described in [9], beam shaping caused by interference is performed, which in any case is only possible if the wavelength of the alternating energy field is small compared to the distance between the transmitting device and the receiving modules.

According to an advantageous further development of the invention, the control means is configured to control the electric energy sources such that, in the energy transfer mode, the electric alternating quantities are controlled in dependence on a singular value decomposition of a matrix depending on a coupling matrix.

From the coupling matrix, taking into account the losses in the transmitting modules, the losses in the receiving modules and the load resistors, a matrix depending on the coupling matrix can be generated, whose singular value decomposition can be used to control the electric alternating quantities of the individual transmitting modules simultaneously such that the electric efficiency of the energy transfer can be optimized. A singular value decomposition (SVD) of a matrix describes its representation as a product of three specific matrices. This allows optimization of the electric efficiency for any number of receiving modules, even if the transmitting modules have different electric properties.

According to a convenient further development of the invention, the control means for each of the transmitting modules is configured to control an amplitude of the respective electric alternating quantity. According to an advantageous further development of the invention, the control means for each of the transmitting modules is configured to control a phase of the respective electric alternating quantity. The above-described control of the amplitudes and/or the phases of the alternating quantities of the individual transmitting modules results in a particularly high electric efficiency.

According to an advantageous further development of the invention, the field generating elements are coils, each of which generates the respective alternating energy field in the form of a magnetic alternating field. In this way, the electric energy can be transferred in an inductively coupled manner, if the field receiving elements of the receiving modules are also coils. The coupling factors correspond to the imaginary part of the stray inductances between the coils of the transmitting device and one coil each of one of the receiving modules divided by the angular frequency of the associated alternating quantity or the associated alternating energy field.

According to a further development of the invention, the field generating elements are capacitances, each of which generates the respective alternating energy field in the form of an electric alternating field. In this way, the electric energy can be transferred in a capacitively coupled manner, if the field receiving elements of the receiving modules are also capacitances. The coupling factors correspond to the imaginary part of the stray capacitances between the capacitances of the transmitting device and one capacitance each of one of the receiving modules divided by the angular frequency of the associated alternating quantity or the associated alternating energy field.

According to an advantageous further development of the invention, in the energy transfer mode, the matrix depending on the coupling matrix depends on a cross coupling matrix, wherein the cross coupling matrix includes cross coupling factors to several or to all of the other field receiving elements for several or for all of the field receiving elements. This can further increase the electric efficiency of the energy transfer, particularly when the cross coupling factors are large relative to the coupling factors. Here, a cross coupling factor corresponds to the imaginary part of the cross stray impedance between one of the field receiving elements and one of the other field receiving elements divided by the angular velocity. If the cross coupling factors are arranged in a matrix-like manner, this results in the cross coupling matrix. If the field receiving elements are coils, the cross coupling factors correspond to the cross stray inductance between one coil of the receiving modules and another coil of the receiving modules divided by the angular frequency of the alternating energy field. If the field receiving elements are capacitances, the cross coupling factors correspond to the cross stray inductance between one capacitance of the receiving modules and another capacitance of the receiving modules divided by the angular frequency of the alternating energy field.

According to a convenient further development of the invention, at least part of the coupling factors is stored in the control means. This solution is particularly suitable when the geometrical arrangement of the receiving modules with respect to the transmitting device is at least approximately known and constant during the energy transfer. In this case, the coupling factors can be determined in advance by means of suitable simulations and stored in the control means.

According to an advantageous further development of the invention, the control means is configured to determine at least part of the coupling factors in a determining mode, wherein the control means is configured to sequentially perform determining sequences for several or for all of the transmitting modules in the determining mode, wherein, in each of the determining sequences, the control means exclusively controls the electric energy source of the respective transmitting module and a receiving quality characterizing quantity is received by the control means from several or from all of the field receiving elements in order to determine one of the coupling factors for the field generating element of the respective transmitting module from each of the receiving quality characterizing quantities. This solution is particularly suitable when the geometrical arrangement of the receiving modules with respect to the transmitting device is variable during the energy transfer. Thereby, the determining mode can be used before the energy transfer mode to optimize the electric efficiency in the subsequent energy transfer mode. Further, the determining mode can be repeated once or several times to be able to react to a change of the geometrical arrangement.

Further, the object is solved by an energy transfer system for contactless transfer of electric energy by means of inductive coupling or by means of capacitive coupling from a transmitting device of the energy transfer system to one or several receiving modules of the energy transfer system;

wherein the receiving modules each comprise a field receiving element for receiving the alternating energy field;

wherein the transmitting device includes a plurality of transmitting modules and control means;

wherein the transmitting modules each include a field generating element for generating an alternating energy field and an electric energy source for providing an electric alternating quantity to the respective field generating element in a wired manner;

wherein, in an energy transfer mode, the control means is configured to control the electric energy sources such that several of the transmitting modules simultaneously generate one of the alternating energy fields each, wherein, in the energy transfer mode, the electric alternating quantities are controlled in dependence on a coupling matrix, wherein the coupling matrix includes coupling factors to several or to all of the field receiving elements for several or for all of the field generating elements.

The advantages stated above result.

According to a convenient further development of the invention, the control means is configured to determine the coupling factors in a determining mode, wherein, in the determining mode, the control means is configured to sequentially perform determining sequences for several or for all of the transmitting modules, wherein, in each of the determining sequences, the control means exclusively controls the electric energy source of the respective transmitting module, wherein, in each of the determining sequences, all or several of the field receiving elements transfer a receiving quality characterizing quantity to the control means and wherein, in each of the determining sequences, the control means determines one of the coupling factors for the field generating element of the respective transmitting module from each of the receiving quality characterizing quantities.

The advantages described above result.

According to a convenient further development of the invention, at least one of the receiving modules comprises an adjustable load resistor, wherein the respective receiving module is configured to adjust the respective load resistor in dependence on the coupling matrix.

In this way, the electric efficiency can be improved further.

According to an advantageous further embodiment of the invention, the energy transfer system comprises several receiving modules, wherein at least one of the receiving modules comprises an adjustable compensation element connected in parallel to the field receiving element, wherein the respective receiving module is configured to adjust the respective compensation element in dependence on a cross coupling matrix, wherein the cross coupling matrix comprises cross coupling factors to several or to all of the other field receiving elements for several or for all of the field receiving elements.

The compensation elements can be coils or capacitances. In this way, the electric efficiency can be improved further, as cross stray impedances can be compensated.

BRIEF DESCRIPTION OF THE DRAWINGS

Embodiments of the present invention will be detailed subsequently referring to the appended drawings, in which.

DETAILED DESCRIPTION OF THE INVENTION

The same or equal elements or elements having the same or equivalent function are provided with the same or equal reference numbers below.

Figure 1:
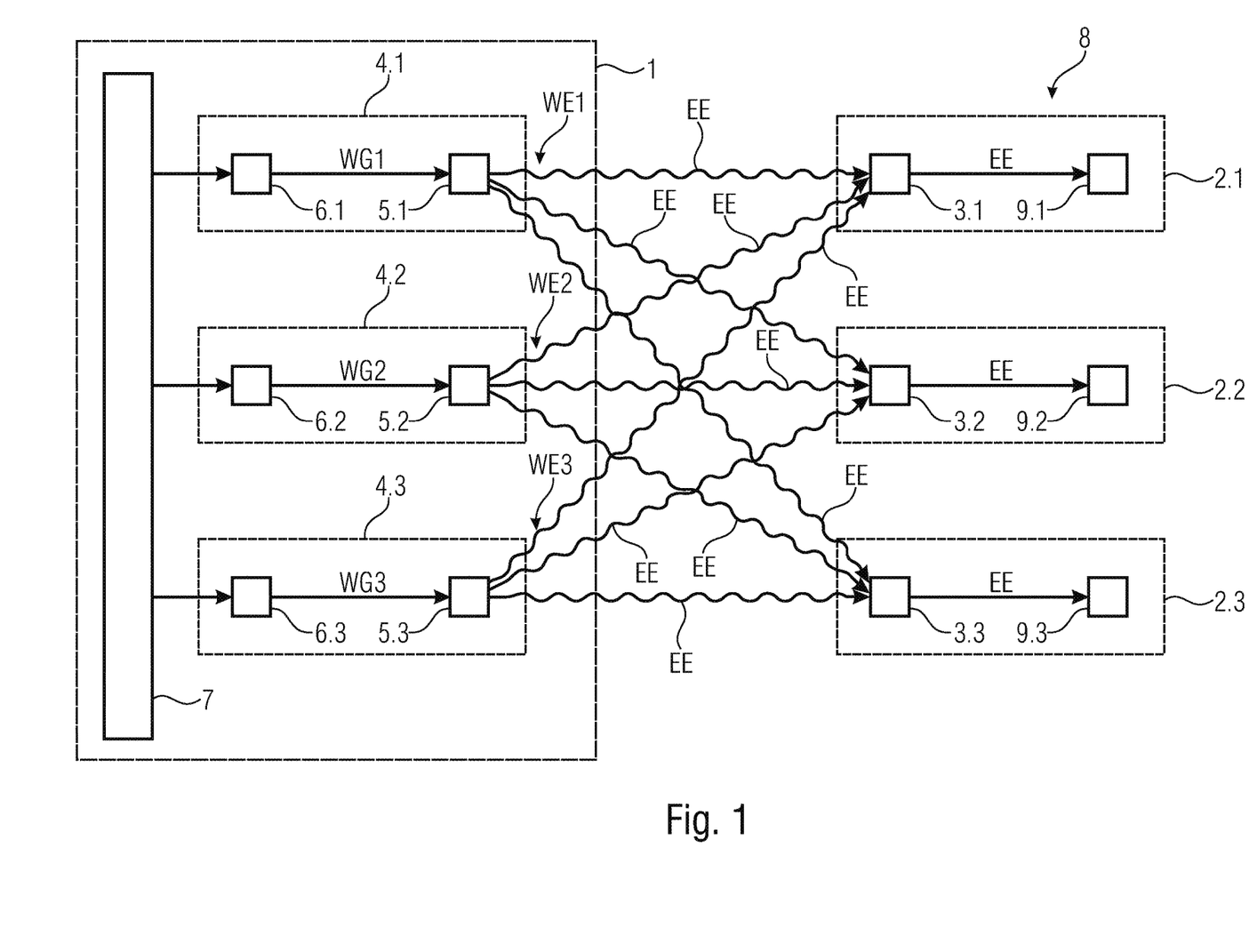
FIG. 1 is a first embodiment of an inventive energy transfer system for contactless transfer of electric energy by means of inductive coupling or by means of capacitive coupling in a schematic illustration, which includes an exemplary inventive transmitting device.

FIG. 1 shows a first embodiment of a transmitting device 1 for contactless transfer of electric energy EE by means of inductive coupling or by means of capacitive coupling to one or more receiving modules 2, which each comprise a field receiving element 3 for receiving electric energy EE, the transmitting device 1 comprising:
  a plurality of transmitting modules 4, each comprising a field generating element 5 for generating an alternating energy field WE and an electric energy source 6 for providing an electric alternating quantity WG to the respective field generating element 5 in a wired manner; and control means 7 configured to control the electric energy sources 5 in an energy transfer mode such that several of the transmitting modules 4 simultaneously generate one of the alternating energy fields WE each, wherein, in the energy transfer mode, the electric alternating quantities WG are controlled in dependence on a coupling matrix KM, wherein the coupling matrix KM comprises coupling factors KF to several or to all of the field receiving elements 3 for several or for all of the field generating elements 5.

According to an advantageous further development of the invention, the control means 7 is configured to control the electric energy sources 5 such that, in the energy transfer mode, the electric alternating quantities WG are controlled in dependence on a singular value decomposition of a matrix depending on a coupling matrix KM.

According to an advantageous further development of the invention, the control means 7 for each of the transmitting modules 4 is configured to control an amplitude of the respective electric alternating quantity WG.

According to a convenient further development of the invention, the control means 7 for each of the transmitting modules 4 is configured to control a phase of the respective electric alternating quantity.

According to an advantageous further development of the invention, the field generating elements 5 are coils, each of which generates the respective alternating energy field WE in the form of a magnetic alternating field.

According to a convenient further development of the invention, the field generating elements 5 are capacitances, each of which generates the respective alternating energy field 5 in the form of an electric alternating field.

According to an advantageous further embodiment of the invention, in the energy transfer mode, the electric alternating quantities WG are the matrix depending on the coupling matrix KM in dependence on a cross coupling matrix KKM, wherein the cross coupling matrix KKM includes cross coupling factors KKF to several or to all of the other field receiving elements 3 for several or for all of the field receiving elements 3.

According to a convenient further development of the invention, at least part of the coupling factors KF is stored in the control means 7.

According to an advantageous further development of the invention, the control means 7 is configured to determine at least part of the coupling factors KF in a determining mode, wherein the control means 7 is configured to sequentially perform determining sequences for several or for all of the transmitting modules 4 in the determining mode, wherein, in each of the determining sequences, the control means 7 exclusively controls the electric energy source 6 of the respective transmitting module 4 and the control means 7 receives a receiving quality characterizing quantity from several or all of the field receiving elements 3 in order to determine one of the coupling factors KF for the field generating element 5 of the respective transmitting module 4 from each of the receiving quality characteristic quantities.

FIG. 1 further shows a first embodiment of an energy transfer system 8 for contactless transfer of electric energy EE by means of inductive coupling or by means of capacitive coupling from a transmitting device 1 of the energy transfer system 8 to one or several receiving modules 2 of the energy transfer system 8;
  wherein the receiving modules 2 each comprise a field receiving element 3 for receiving electric energy EE;
  wherein the transmitting device 1 includes a plurality of transmitting modules 4 and a control means 7;

wherein the transmitting modules 4 each include a field generating element 5 for generating an alternating energy field WE and an electric energy source 6 for providing an electric alternating quantity WG to the respective field generating element 5 in a wired manner;

wherein the control means 7 is configured to control the electric energy sources 6 in an energy transfer mode such that several of the transmitting modules 4 simultaneously generate one of the alternating energy fields WE each, wherein, in the energy transfer mode, the electric alternating quantities WG are controlled in dependence on a coupling matrix KM, the coupling matrix KM includes coupling factors KF to several or to all of the field receiving elements 3 for several or for all of the field generating elements 5.

According to a convenient further development of the invention, the control means 7 is configured to determine the coupling factors KF in a determining mode, wherein the control means 7 is configured to sequentially perform determining sequences for several or for all of the transmitting modules 4 in the determining mode, wherein, in each of the determining sequences, the control means 7 exclusively controls the electric energy source 5 of the respective transmitting module 4, wherein, in each of the determining sequences, several or all of the field receiving elements 3 transfer a receiving quality characterizing quantity to the control means 7, and wherein, in each of the determining sequences, the control means 7 determines one of the coupling factors KF for the field generating element 5 of the respective transmitting module 4 from all or several of the receiving quality characterizing quantities.

According to an advantageous further development of the invention, at least one of the receiving modules 2 comprises an adjustable load resistor 9, wherein the respective receiving module 2 is configured to adjust the respective load resistor 9 in dependence on the coupling matrix KM.

According to a convenient further development of the invention, the energy transfer system 8 comprises several receiving modules 2, wherein at least one of the receiving modules 2 comprises an adjustable compensation element connected in parallel to the field receiving element 3, wherein the respective receiving module 2 is configured to adjust the respective compensation element in dependence on a cross coupling matrix KKM, wherein the cross coupling matrix KKM comprises cross coupling factors KKF to several or all of the other field receiving elements 3 for several or all of the field receiving elements 3.

In the first embodiment, the energy transfer system 8 includes the transmitting device 1, which in turn includes three transmitting modules 4.1, 4.2 and 4.3. The transmitting module 4.1 includes the field generating element 5.1 as well as the energy source 6.1 and generates the alternating energy field WE1. The transmitting module 4.2 includes the field generating element 5.2 as well as the energy source 6.2 and generates the alternating energy field WE2. Further, the transmitting module 4.3 includes the field generating element 5.3 as well as the energy source 6.3 and generates the alternating energy field WE3.

Here, the energy transfer system 8 includes three receiving modules 2.1, 2.2, and 2.3. The receiving module 2.1 includes a field receiving element 3.1 and a load resistor 9.1. The receiving module 2.2 includes a field receiving element 3.2 and a load resistor 9.2. Further, the receiving module 2.3 includes a field receiving element 3.3 and a load resistor 9.3.

Each of the alternating energy fields WE1, WE2 and WE3 simultaneously transfers electric energy EE to each of the field receiving elements 3.1, 3.2 and 3.3. The field receiving element 3.1 transfers the received part of the electric energy EE to the load resistor 9.1. The field receiving element 3.2 transfers the received part of the electric energy EE to the load resistor 9.2. Further, the field receiving element 3.3 transmits the received part of the electric energy EE to the load resistor 9.3.

Figure 2:
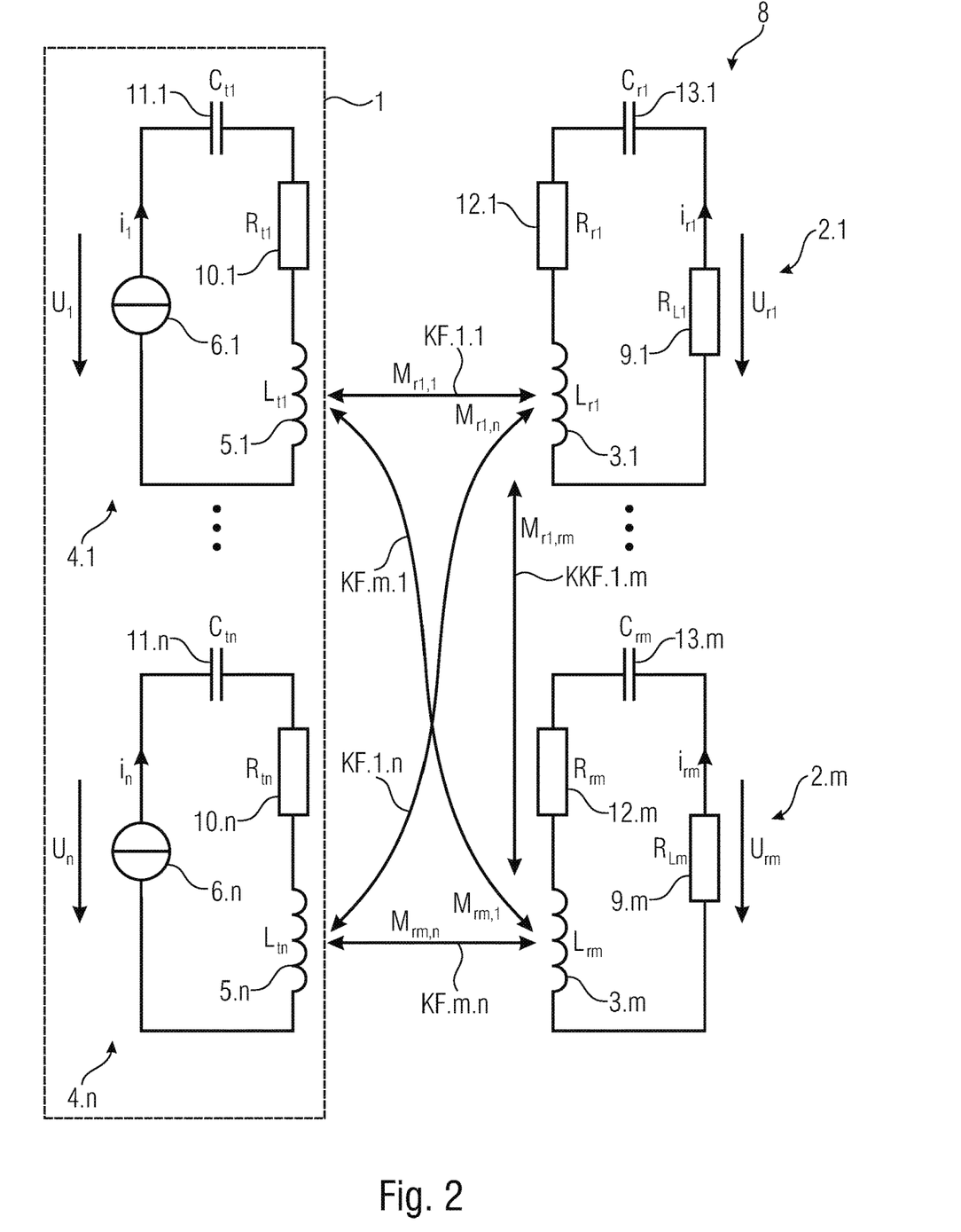
FIG. 2 is a general exemplary equivalent circuit diagram of an inventive energy transfer system.

FIG. 2 shows a general exemplary equivalent circuit diagram of an inventive energy transfer system 8. Shown is a wireless energy transfer with a transmitting device 1 having several transmitting modules 4.1 to 4.*n*, which each comprise a field generating element 5.1 to 5 configured as a transmitting coil, and with one or several receiving devices having one or several receiving modules 2.1 to 2.*m*, which each comprise a field receiving element 3.1 to 3.*m* configured as a receiving coil.

In the following considerations, monofrequency signals are considered, which have a phase relationship to a fixed reference signal. For illustration purposes, the signals are considered as complex amplitudes. All considerations serve to maximize the efficiency of the energy transfer.

Only the electric efficiency is considered. The same is equal to the quotient of the energy fed into the system and the energy extracted from the system.

In the following considerations, wireless energy transfer via coils is considered. However, the same formulas also apply analogously to capacitive energy transfer. The energy transfer is operated in a resonant manner, this serves mainly for the energy transfer across larger distances. However, this is not mandatory for the considerations.

Due to the consideration of coils, the stray inductance M between the same is considered. Here, M_{i,j} is the stray inductance between coil i and coil j. M_{i,i} is the self-inductance of coil i. The self-inductance is considered as compensated, if not mentioned otherwise.

Nevertheless, the self-inductance of the transmitting coils has no influence on the efficiency of the energy transfer system 8. The influence is only on the needed reactive power, which has no influence on the coil efficiency or on the optimally selected current.

For the compact presentation of the calculations, the self-inductance is therefore assumed to be zero.

The currents are designated by 1. The index indicates which current is considered. The same applies to the voltages and ohmic losses R in the coils.

The index r is used as an abbreviation for the receiver. The index t is used as an abbreviation for the transmitter.

R_L is used as the load resistor 9 on the receiving side in the system as the sink for the energy transfer. This represents the consumer in the system.

The energy transfer system 8 includes a transmitting device 1, which includes n transmitting modules 4.1 to 4.*n*. Above that, the energy transfer system 8 includes m receiving modules 2.1 to 2.*m*.

The transmitting module 4.1 includes a field generating element 5.1, which is configured here as a coil with the value $L_{t1}$, an energy source 6.1, which can be configured as a voltage source or as a current source, a loss resistor 10.1 with the value $R_{t1}$ and a transmitter capacitance 11.1 with the value $C_{t1}$. The voltage $U_1$ is applied to the energy source 6.1 and the current $i_1$ flows. The transmitting module 4.*n* includes a field generating element 5.*n*, which is configured here as a coil with the value $L_{tn}$, an energy source 6.*n*, which can be configured as a voltage source or as a current source, a loss resistor 10.*n* with the value $R_{tn}$ and a transmitter capacitance 11.*n* with the value $C_{tn}$. Here, the voltage $U_n$ is applied to the energy source 6.*n* and the current $i_n$ flows.

The receiving module 2.1 includes a field receiving element 3.1, which is configured here as a coil with the value $L_{r1}$, a load resistor 11.1 with the value $R_{L1}$, a loss resistor 12.1 with the value $R_{r1}$ and a receiver capacitance 13.1 with the value $C_{r1}$. The voltage $U_{r1}$ is applied to the load resistor 9.1 and the current $i_{r1}$ flows. The receiving module 2.$m$ includes a field receiving element 3.$m$, which is configured here as a coil with the value $L_{rm}$, a load resistor 11.$m$ with the value $R_{Lm}$, a loss resistor 12.$m$ with the value $R_{rm}$ and a receiver capacitance 13.$m$ with the value $C_{rm}$. Here, the voltage $U_{rm}$ is applied to the load resistor 9.$m$ and the current $i_{rm}$ flows.

$M_{r1.1}$ is the coupling factor KF.1.1 between the transmitting module 4.1 and the receiving module 2.1, $M_{rm.1}$ is the coupling factor KF.m.1 between the transmitting module 4.1 and the receiving module 2.$m$, $M_{r1.n}$ is the coupling factor KF.1.$n$ between the transmitting module 4.$n$ and the receiving module 2.1, and $M_{rm.n}$ is the coupling factor KF.m.n between the transmitting module 4.$n$ and the receiving module 2.$m$, $M_{r1.rm}$ is the cross coupling factor KKF.1.$m$ between the receiving module 2.1 and the receiving module 2.$m$.

Figure 3:
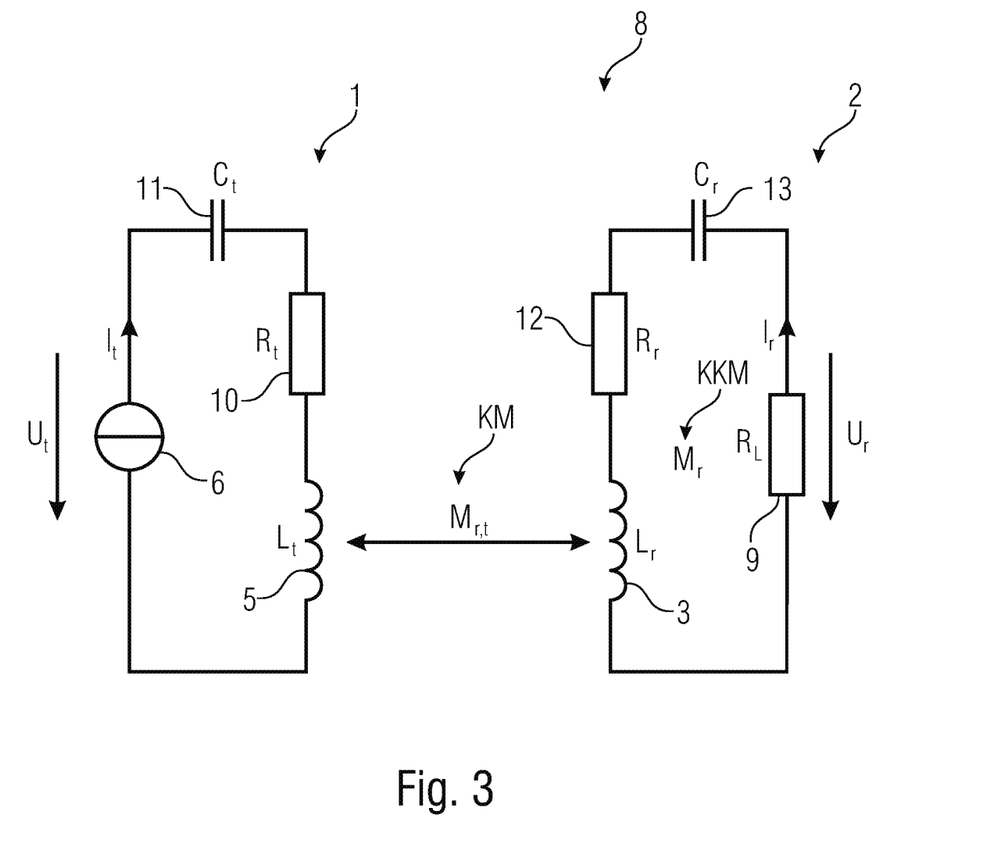
FIG. 3 is a further general exemplary equivalent circuit diagram of an inventive energy transfer system.

FIG. 3 shows another general exemplary equivalent circuit diagram of an inventive energy transfer system. Multi-dimensional quantities are used for a compact illustration. Thus, the coupling factors KF of the transmitting modules 4.1 to 4.$n$ to the receiving modules 2.1 to 2.$m$ are combined to Kr, which results in the coupling matrix KM. The values of the cross coupling factors between the receiving modules 2.1 to 2.$m$ are combined to $M_r$, which results in the cross coupling matrix KKM.

The values of the field generating elements 5.1 to 5.$n$ are combined to the vector $L_t$. The values of the loss resistors 10.1 to 10.$n$ of the transmitting modules 4.1 to 4.$n$ are combined to the vector $R_t$. The values of the transmitter capacitances 11.1 to 11.$n$ are combined to the vector $C_t$. The values of the voltages and currents at the energy sources 6.1 to 6.$m$ are combined to the vectors $U_t$ and $I_t$.

The values of the field receiving elements 3.1 to 3.$m$ are combined to the vector $L_r$. The values of the load resistors 9.1 to 9.$m$ of the receiving modules 2.1 to 2.$m$ are combined to the vector $R_r$. The values of the loss resistors 12.1 to 12.$m$ of the receiving modules 2.1 to 2.$m$ are combined to the vector $R_L$. The values of the receiver capacitances 13.1 to 13.$m$ are combined to the vector $C_r$. The values of the voltages and currents on the receiver side are combined to the vectors $U_r$ and $I_r$.

The following current-voltage relation result:

$$\begin{bmatrix} U_t \\ U_r \end{bmatrix} = \begin{bmatrix} U_t \\ -R_L I_r \end{bmatrix} = j\omega \begin{bmatrix} 0 & M_{r,t} \\ M_{r,t} & 0 \end{bmatrix} \begin{bmatrix} I_t \\ I_r \end{bmatrix}$$

The value PTE of the efficiency, which is maximized, is as follows:

$$PTE = \frac{I_r^H R_L I_r}{I_t^H R_t I_t + I_r^H (R_r + R_L) I_r}$$

The singular value decomposition can be described by the following equation:

$$U \Lambda V^H = R_t^{-1/2} M_{r,t}^H (R_r + R_L - j\omega M_{r,r})^{-1} R_L^{1/2},$$

where the right side is the matrix depending on the coupling matrix KM, wherein U is a unitary matrix, wherein $\Lambda$ is a real diagonal matrix, and wherein $V^H$ is an adjoint of a unitary matrix. If the cross coupling factors KKF are negligibly small, the term $-j\omega M_{r,r}$ can also be omitted.

The optimum distribution of the currents for the transmitting modules 4.1 to 4.$n$ are obtained by the following relation:

$$I_t \propto R_i^{-1/2} u_1,$$

wherein $u_1$ is the first column vector of the matrix U. The values of the currents can then be calculated from the needed power.

If the transmitting modules 4.1 to 4.$n$ are identical in construction or have the same electric properties and merely one receiving module 2 is provided, the determination of the optimum current distribution is simplified. The current distribution is then proportional to the values of the then one-dimensional coupling matrix KM, where the following applies:

$$I_t = M_{r,t}^H \cdot \text{const.}$$

The optimum voltage distribution for the transmitting modules 4.1 to 4.$n$ can be calculated from the optimum current distribution:

$$U_t = j\omega \begin{bmatrix} M_{t,t} & M_{r,t}^T \end{bmatrix} \begin{bmatrix} I_t \\ I_r \end{bmatrix} + R_t I_t$$

The optimum load resistor 9.1 to 9.$m$ for receiving modules 2 is given by the following formula:

$$R_{Lk} = R_{rk} \sqrt{1 + \omega^2 \frac{I_t^H M_{r,t}^H R_r^{-1} M_{r,t} I_t}{I_t^H R_t I_t}}$$

Here, however, it has been assumed that the field receiving elements 3.1 to 3.$m$ have a negligible cross stray impedance to each other. This restriction can be dropped if another compensation element with an impedance of value X is used. These can each be connected in series to one of the field receiving elements 3.1 to 3.$m$. The values X can be calculated for the k-th receiver of all m receivers as follows:

$$X_k = -\frac{1}{I_{rk}} \sum_{i=1}^{m} M_{rk,ri} I_{ri}$$

where $I_{ri}$ represents the current in the i-th receiving module 2 to 2.$m$, which flows when no cross stray impedances exist between the field receiving elements 3.1 to 3.$m$.

Figure 4:
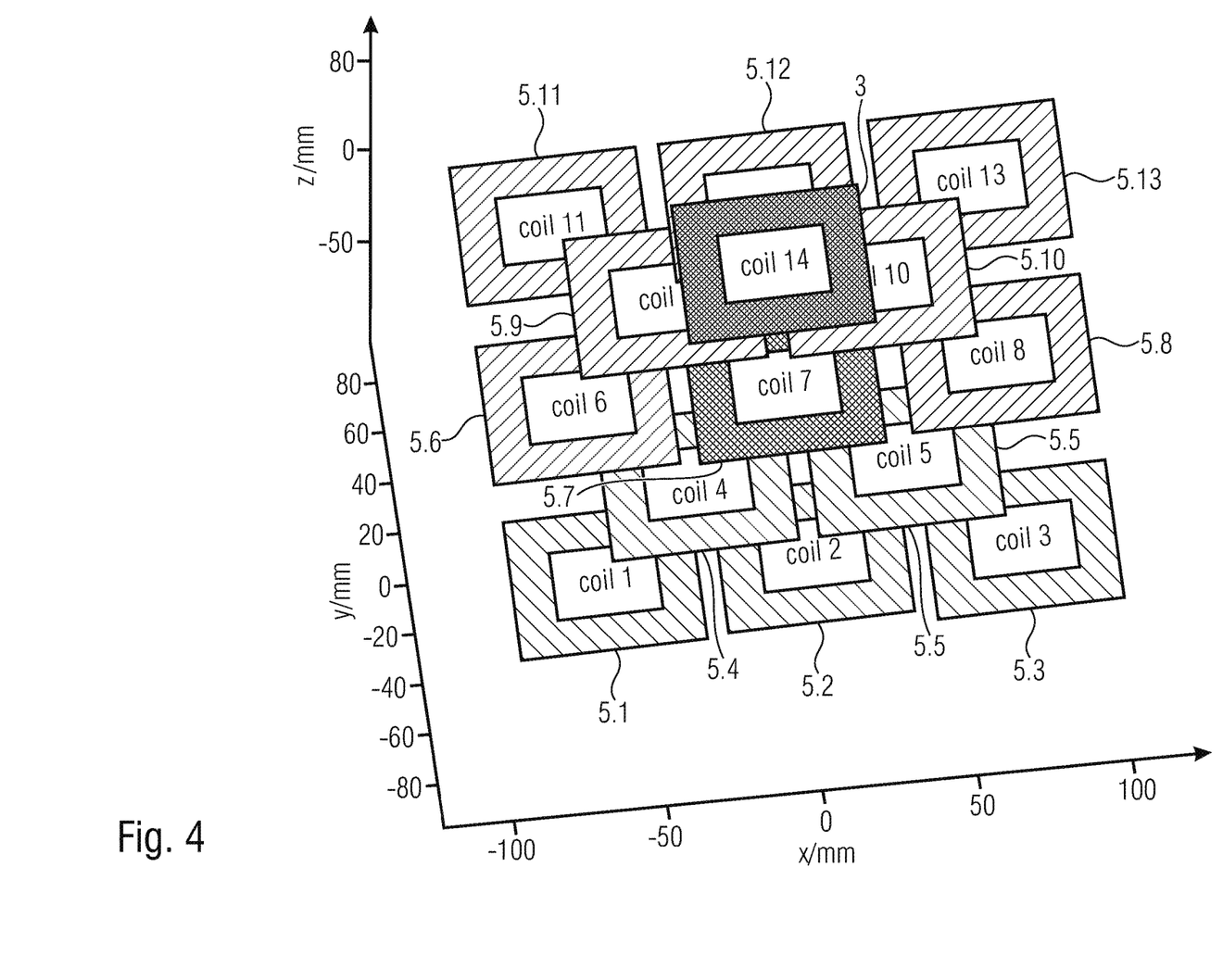
FIG. 4 is a second embodiment of an inventive energy transfer in a simplified partial representation.

FIG. 4 shows a second embodiment of an inventive energy transfer system 8 in a simplified partial representation. Thirteen 5.1 to 5.13 are shown, which are each configured as coils. Also shown is a field receiving element 3, which is also configured as a coil.

Figure 5:
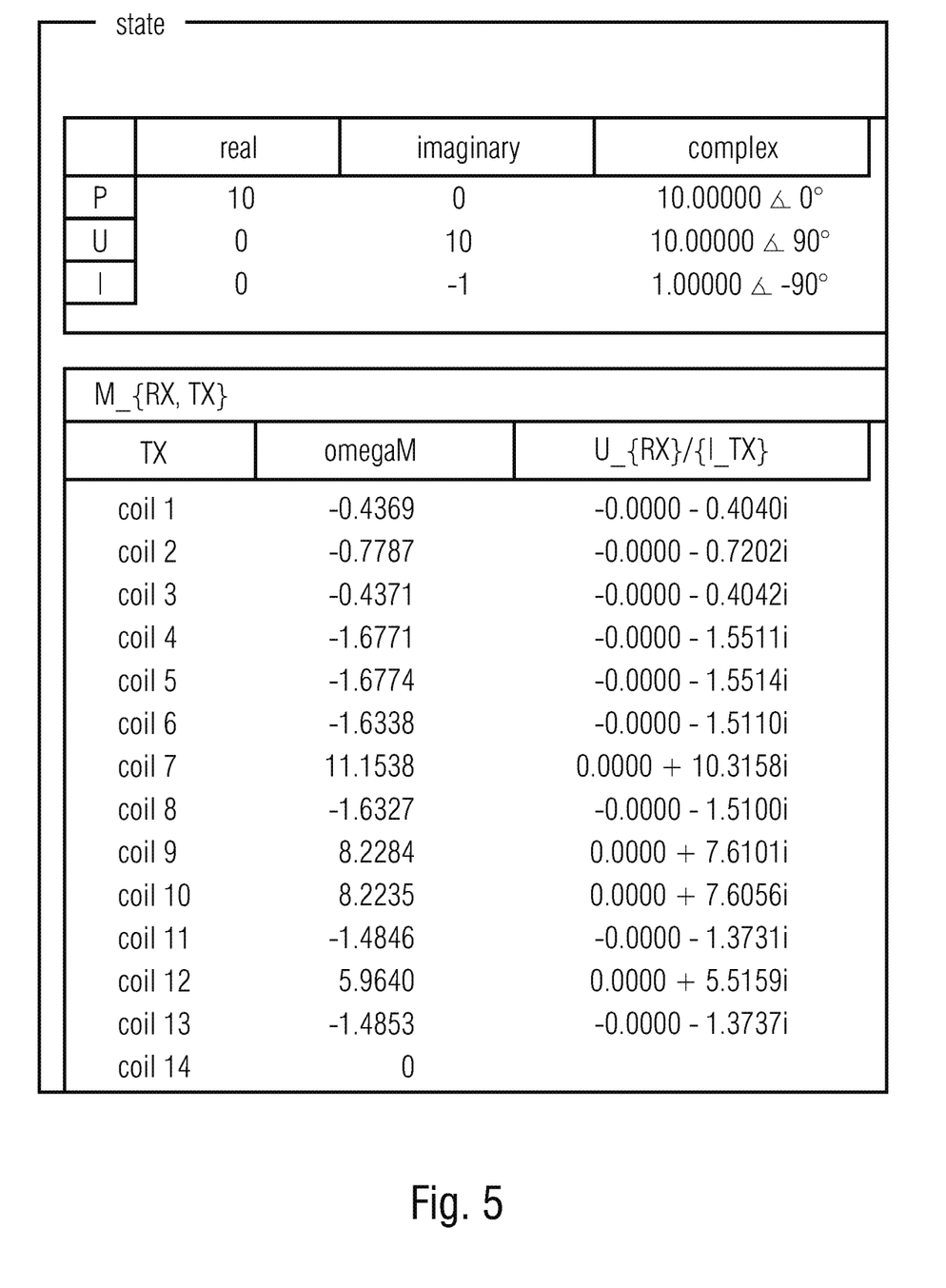
FIG. 5 is an exemplary representation of the imaginary parts of the stray impedances of the second embodiment.

FIG. 5 shows an exemplary representation of the imaginary parts of the stray impedances of the second embodiment, which were determined by means of a simulation. In the example, an active power of 10 W at a voltage of 10 V and a current of 1 A is to be transferred. In the column "TX" the designations of the field generating elements 5.1 to 5.13 and of the field receiving element 3 are given. In the column "omegaM" the respective imaginary parts of the stray impedances are shown. In the column "U_{RX}/{I_TX}" the calculated real part and the calculated imaginary part of the ratio of the voltage at the load resistor 9 of the receiving module 2 and the currents in the transmitting modules 4.1 to 5.13 of the transmitting device 1.

Figure 6:
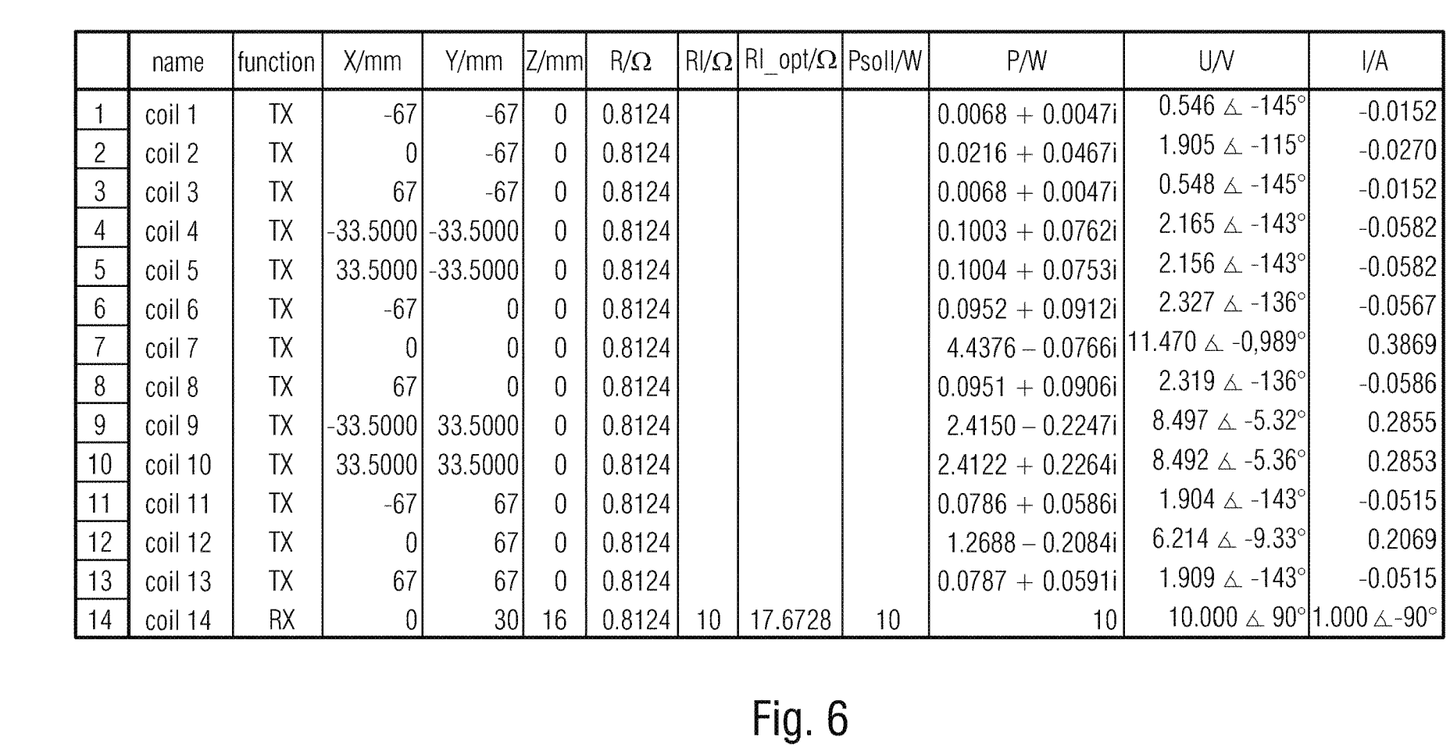
FIG. 6 is an exemplary representation of the currents and voltages of the field generating elements of the second embodiment adjusted by the control means of the transmitting device.

FIG. 6 shows an exemplary representation of the currents and voltages of the second embodiment adjusted by the control means 7 of the transmitting device 1, which were determined by means of a simulation. In the column "name", the designations of the field generating elements 5.1 to 5.13 as well as of the field receiving element 3 are indicated. In the columns "X", "Y" and "Z" the positions of the field generating elements 5.1 to 5.13 as well as of the field receiving element 3 are indicated. Further, the loss resistors 10.1 to 10.13 of the field generating elements 5.1 to 5.13 as well as the loss resistor 12 of the field receiving element 3 are shown in the column "R". In the column "RI" the load resistor 9 of the receiving module 2 is shown. Further, the optimum load resistor 9 of the receiving module 2 is shown in the column "RI_opt". Finally, the columns "P", "U" and "I" show the energy, voltage and current in modules 2 and 4.1 to 4.13. The result is a very high electric efficiency of 0.9.

In the following description, embodiments having a plurality of features of the present invention are described in more detail to provide a better understanding of the invention. It should be noted, however, that the present invention could also be implemented by omitting some of the features described. It should also be noted that the features shown in various embodiments could also be combined in other ways, unless this is expressly excluded or would lead to contradictions.

Aspects of the invention described in connection with a transmitting device also relate to the corresponding energy transfer system. Conversely, aspects of the invention described in connection with the energy transfer system also relate to the corresponding transmitting device.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCE NUMBERS 1 transmitting device
2 receiving module
3 field receiving element
4 transmitting module
5 field generating element
6 energy source
7 control means
8 energy transfer system
9 load resistor
10 loss resistor
11 transmitter capacitance
12 loss resistor
13 receiver capacitance
EE electric energy
WE alternating energy field
WG electric alternating quantity
KF coupling factor
KM coupling matrix
KKF cross coupling factor
KKM coupling matrix

REFERENCES

[1] DE102016221225A1
[2] DE102018219460A1
[3] U.S. Pat. No. 9,013,068B2
[4] EP2346136A1
[5] KR101916636B1
[6] WO2017171435A1
[7] CN104485507A
[8] KR102029919B1
[9] U.S. Pat.. No. 10,425,837B2
[10] US000010230271B2
[11] KR101932383B1
[12] EP3054559A1
[13] DOI: 10.1109/TI1.2016.2516906
[14] DOI: 10.1109/TMTT.2015.2398422
[15] DOI: 10.1109/WPT.2014.6839600
[16] DOI: 10.1109/ICASSP.2016.7472415
[17] https://www.comm.utoronto.ca/~rsadve/Notes/BeamForming.pdf.

The invention claimed is:

1. Energy transfer system for contactless transfer of electric energy by means of inductive coupling or by means of capacitive coupling from a transmitting device of the energy transfer system to several receiving modules of the energy transfer system;
    wherein the receiving modules each comprise a field receiving element for receiving electric energy;
    wherein the transmitting device comprises a plurality of transmitting modules and a controller;
    wherein the transmitting modules each comprise a field generating element for generating an alternating energy field and an electric energy source for providing an electric alternating quantity to the respective field generating element in a wired manner;
    wherein, in an energy transfer mode, the controller is configured to control the electric energy sources such that several of the transmitting modules simultaneously generate one of the alternating energy fields each, wherein, in the energy transfer mode, the electric alternating quantities are controlled in dependence on a coupling matrix, wherein the coupling matrix comprises coupling factors to several or to all of the field receiving elements for several or for all of the field generating elements,
    wherein at least one of the receiving modules comprises an adjustable compensation element connected in parallel or in series to the field receiving element, wherein the respective receiving module is configured to adjust the respective compensation element in dependence on a cross coupling matrix, wherein the cross coupling matrix comprises cross coupling factors to several or to all of the other field receiving elements for several or all of the field receiving elements, wherein each of the cross coupling factors corresponds to the imaginary part of a cross stray impedance between one of the field receiving elements and one of the other field receiving elements divided by an angular velocity.

2. Energy transfer system according to claim 1, wherein the controller is configured to determine the coupling factors in a determining mode, wherein the controller is configured to sequentially perform determining sequences for several or for all of the transmitting modules in the determining mode, wherein, in each of the determining sequences, the controller exclusively controls the electric energy source of the respective transmitting module, wherein, in each of the determining sequences, several or all of the field receiving elements transmit a receiving quality characterizing quantity to the controller and wherein, in each of the determining sequences, the controller determines one of the coupling factors for the field generating element of the respective transmitting module from all or several of the receiving quality characterizing quantities.

3. Energy transfer system according to claim 1, wherein at least one of the receiving modules comprises an adjustable load resistor, wherein the respective receiving module is configured to adjust the respective load resistor in dependence on the coupling matrix.

4. Energy transfer system according to claim 1, wherein the controller is configured to control the electric energy sources such that, in the energy transfer mode, the electric alternating quantities are controlled in dependence on a singular value decomposition of a matrix depending on a coupling matrix.

5. Energy transfer system according to claim 1, wherein the controller for each of the transmitting modules is configured to control an amplitude of the respective electric alternating quantity.

6. Energy transfer system according to claim 1, wherein the controller for each of the transmitting modules is configured to control a phase of the respective electric alternating quantity.

7. Energy transfer system according to claim 1, wherein the field generating elements are coils, each of which generates the respective alternating energy field in the form of a magnetic alternating field.

8. Energy transfer system according to claim 1, wherein the field generating elements are capacitances, each of which generates the respective alternating energy field in the form of an electric alternating field.

9. Energy transfer system according to claim 1, wherein, in the energy transfer mode, the matrix depending on the coupling matrix depends on a cross coupling matrix, wherein the cross coupling matrix comprises cross coupling factors to several or to all of the other field receiving elements for several or for all of the field receiving elements.

10. Energy transfer system according to claim 1, wherein at least part of the coupling factors is stored in the controller.

* * * * *